Figure 1:
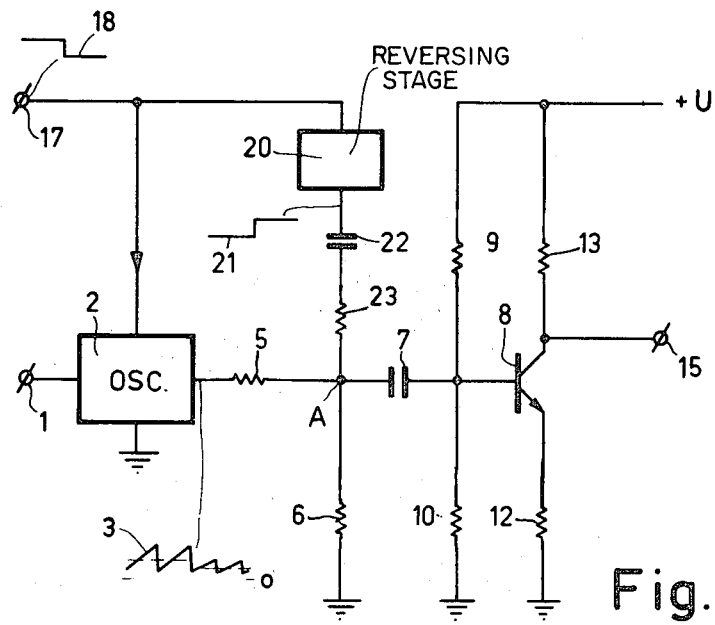

United States Patent [19]

Wölber

[11] 4,075,570

[45] Feb. 21, 1978

[54] CIRCUIT ARRANGEMENT FOR TRANSMITTING AN ALTERNATING CURRENT OSCILLATION HAVING DIRECT CURRENT COMPONENTS WHICH CAN BE CHANGED ABRUPTLY

[75] Inventor: Jörg Wölber, Pinneberg-Thesdorf, Germany

[73] Assignee: U.S. Philips Corporation, New York, N.Y.

[21] Appl. No.: 714,256

[22] Filed: Aug. 13, 1976

[30] Foreign Application Priority Data

Aug. 16, 1975 Germany .............................. 2536495

[51] Int. Cl.² .............................................. H03K 1/14
[52] U.S. Cl. .................................... 328/262; 328/217; 328/267; 307/297; 358/166; 315/370
[58] Field of Search ............... 328/167, 217, 262, 267; 358/166; 315/370; 307/297, 228, 295

[56] References Cited

U.S. PATENT DOCUMENTS

| | | | |
|---|---|---|---|
| 2,865,991 | 12/1958 | Risner | 358/166 |
| 3,015,737 | 1/1962 | Harris et al. | 307/295 |
| 3,089,094 | 5/1963 | French | 328/267 |
| 3,147,397 | 9/1964 | Michaelson | 315/370 |
| 3,612,917 | 10/1971 | Sltcliffe et al. | 328/267 |
| 3,626,238 | 12/1971 | Forster | 328/262 |

*Primary Examiner*—John S. Heyman
*Attorney, Agent, or Firm*—Frank R. Trifari; Henry I. Steckler

[57] ABSTRACT

A circuit is shown for compensating for rapid changes in D.C. levels in high pass filter coupled vertical deflection circuits. It features a second high pass filter that applies a D.C. signal having a second level change so that the first change is cancelled out. The second change can be applied directly to the first change with opposite polarity, or to the emitter of a transistor that receives the first change at its base with the same polarity.

8 Claims, 2 Drawing Figures

CIRCUIT ARRANGEMENT FOR TRANSMITTING AN ALTERNATING CURRENT OSCILLATION HAVING DIRECT CURRENT COMPONENTS WHICH CAN BE CHANGED ABRUPTLY

The invention relates to a circuit arrangement for transmitting an alternating current oscillation comprising a direct current component associated, for example approximately proportionally, with an alternating current amplitude, via a (first) high-pass filter, an isolating capacitor in particular which separates the direct current component, to an impedance, that of a subsequent amplifier in particular in which the amplitude of the alternating current oscillation can be changed rapidly, almost jump-like, by means of a control signal.

The high-pass filter separates a constant remaining direct current component so that subsequent circuit parts, for example amplifiers and display apparatus such as the display tube of a television receiver are only controlled by the alternating current portion. If, however, the direct current component is changed rapidly, that is in an abrupt manner, these changes are also transmitted and possibly displayed, in any case in a period of time which is determined by the delay time of coupling elements and networks, RC elements in particular. This may cause the operating point of an A.C. amplifier to be shifted in an undesired manner such that the A.C. signal is distorted; when the indication or display of the A.C. signal is also sensitive to very slow changes such direct current changes are also produced. Such a direct current surge may, for example, produce disturbing vertical shifts in the sawtooth shaped deflection of a picture display tube.

Such jumps in the D.C. components are caused by a corresponding direct current control signal with which, for example, the gain of an A.C. amplifier is changed by shifting the operating point thereof or with which the period and/or amplitude of a sawtooth oscillation is changed which is unidirectional at a uniform polarity and which consequently shows a D.C. component which is proportional to the sawtooth amplitude.

The disadvantages mentioned are obviated when in accordance with the invention the control signal is also applied via a second high-pass filter before or after the first high-pass filter, respectively, with a variation compensating for the influence of the rapid change of the direct current component on the transmitted oscillation.

Advantageously, the control signal may be supplied, in a direction which is opposite to the D.C. component of the alternating current oscillation to the input of the first high-pass filter via a second high-pass filter whose cut-off frequency is essentially lower than that of the first high-pass filter. Consequently the influence of the change of the D.C. component is immediately compensated by means of the control signal at its steep leading edge and the transition to the steady state in which, at a constant D.C. component no effect is produced in the subsequent A.C. channel, occurs so slowly that the A.C. output signal is not affected.

When the high-pass coupling element is followed by a base-controlled transistor amplifier the control signal can be applied to the emitter impedance in the same direction with respect to the D.C. component of the A.C. oscillation via a second high-pass filter having a time constant which is at least approximately equal to that of the first high-pass filter. Then base and emitter are driven in the same manner by the direct current surge so that the effects on the collector current are compensated for. As herein the disturbing effect and the compensation have the same time behaviour, such a circuit is particularly suitable there where such direct current jumps may occur one after the other at short intervals.

Below the invention will be further explained by means of embodiments shown in FIGS. 1 and 2 of the drawing, which embodiments show, partially diagrammatically the control stage for the vertical deflection of the picture display tube in a television receiver.

In such a television receiver the problem arises that at a stronger beam current, when bright picture elements are predominant the high tension decreases owing to its non-zero internal resistance. This causes the deflection sensitivity to increase and the picture then becomes larger at a constant deflection amplitude. If thus large differences in brightness are suddenly produced, also the displayed picture size changes at a clearly noticeable speed: the edges shift.

To obviate this drawback it is known to reduce also the deflection amplitude at an increasing beam current and a decreasing high tension. To this end a control signal which represents the intensity of the deflection current is supplied in some way or another to the deflection circuit. This control signal corresponds, for example, to the change in the average picture brightness at a change from a dark to a bright scene. So in a sense, a direct current value is concerned which indeed shows a sudden change but which is constant to a large degree before and after it.

Deflection circuits essentially comprise A.C. amplifiers which are coupled to one another through at least one high-pass filter. A suddenly changing direct current-control signal of the kind mentioned produces also in the stage to which it is supplied a direct current change whose steady state value is not transmitted via the high-pass filter. Its, for example sudden, change, however, produces a change in the charge condition of a capacitor comprised in the high-pass filter or the magnetizing current of a coupling transformer so that a leading edge which corresponds to the direct current change and the gradually, generally exponentially, decaying trailing edge is produced at the output of the relevant transmission element. By means of additional delay elements (storage elements) this transmitted value may have changed to a higher degree: in any case, however, an albeit temporary shift of the average value of the transmitted A.C. signal is produced.

In FIG. 1 an oscillator 2 whose frequency and phase is controlled or synchronized at a terminal 1 produces vertical deflection sawtooth oscillations whose voltage variation is shown at 3. Their frequency is, for example, 50 Hz, so the period 20 ms.

These sawtooth oscillations are supplied via a resistance 5 which may be constituted by the internal resistance of the oscillator 2 to a point A, which is connected to earth through a resistor 6 and the base of an npn transistor 8 through a capacitor 7 of for example 10 $\mu$F. The base of transistor 8 is connected to the tap of a voltage divider constituted by resistors 9 and 10, of for example 68 kOhm each, which are connected to earth. The emitter of transistor 8 is connected to earth through the resistor 12 whilst the collector of transistor 8 is connected to the positive pole +U of the voltage source through a resistor 13.

The amplified sawtooth oscillations are derived from a terminal 15 which is connected to the collector of transistor 8. They may be supplied to the vertical deflection coils of a television picture tube via at least one further amplifier.

If with a sudden increase of the picture brightness the amplitude of the vertical deflection must be reduced, a voltage jump is produced at a terminal 17 and which is shown at 18. For example, the supply voltage for oscillator 2 may be supplied to this terminal which oscillator produces the sawtooth voltage 3 by periodically charging and discharging a capacitor by means of this modified supply voltage. A greater sawtooth amplitude is obtained at a normal supply voltage whilst the supply voltage, which is decreased as shown in the second part of curve 18 results in the lower sawtooth voltage shown in the two last cycles of curve 3.

As these sawtooth voltages are produced by a capacitor as mentioned above, they normally have a unidirectional polarity above the zero value which is indicated by a solid line. As a consequence, besides the pure sawtooth A.C. component also a D.C. value indicated by a dashed line, is obtained which corresponds to approximately half the sawtooth amplitude and which changes suddenly from a higher to a lower value between the second and the third cycle owing to the decrease in amplitude. Normally this change would be transferred to point A where it would, so to speak, be differentiated by means of the capacitor in such a way that a negative voltage then suddenly occurs at the base of the transistor 8, whilst the side of the capacitor 7 which is connected to the voltage divider 9, 10 at first maintains its voltage with respect to point A. Then the charge changes until finally the new D.C. value is indeed found at the point A, however, the base of transistor 8 has again been biased to the value which is determined by the voltage divider 9, 10. This charge proceeds approximately exponentially so that the base voltage of the transistor 8 is first shifted steeply to a lower positive value whereafter it gradually returns to the original value.

According to the invention the control signal on the terminal 17 is now supplied to a stage 20 which reverses the sense of direction of the variation in the control signal so that at its output a curve is obtained which is approximately of the shape illustrated by 21. This reverse control signal is supplied to the above-mentioned point A between resistor 5 and capacitor 7 via a capacitor 22 and resistor 23.

So if a downward D.C. jump corresponding to curve 18 is supplied by oscillator 2 to point A because of the change of the D.C. component of the sawtooth voltage, an upward D.C. jump corresponding to curve 21 is simultaneously supplied through capacitor 22 and resistor 23 in such a way that the two rapid changes compensate each other at least to a large degree: this D.C. change then substantially does not affect the subsequent amplifier, the base of transistor 8 in particular.

The supply element comprising the capacitor 22 and the resistor 23 also constitutes a high-pass filter; so in the long run it cannot compensate for the permanent change of the D.C. component which originates from oscillator 2. In accordance with the invention the cut-off frequency of this second high-pass filter is adjusted to an essentially lower value as that of the first high-pass filter. As a result a potential shift is produced, via capacitor 22 at point A which, corresponding to the time constant of the high-pass filter which comprises the capacitor 22 proceeds however so slowly that it is substantially not transmitted by the first high-pass filter with high cut-off frequency comprising the capacitor 7. Owing to the large time constant the charge process of the capacitor 22 is extended in the time and consequently the amplitude at point A decreases. Satisfactory results have been obtained in practice with a second time constant which is 4 times, preferably 10 times as large as the first time constant.

The amplitude of the compensating voltage jumps can be adjusted by means of the resistor 23 and consequently the compensation can be adjusted. The capacitance of capacitor 22 especially affects the time behaviour after the jump and consequently is little critical.

Figure 2:
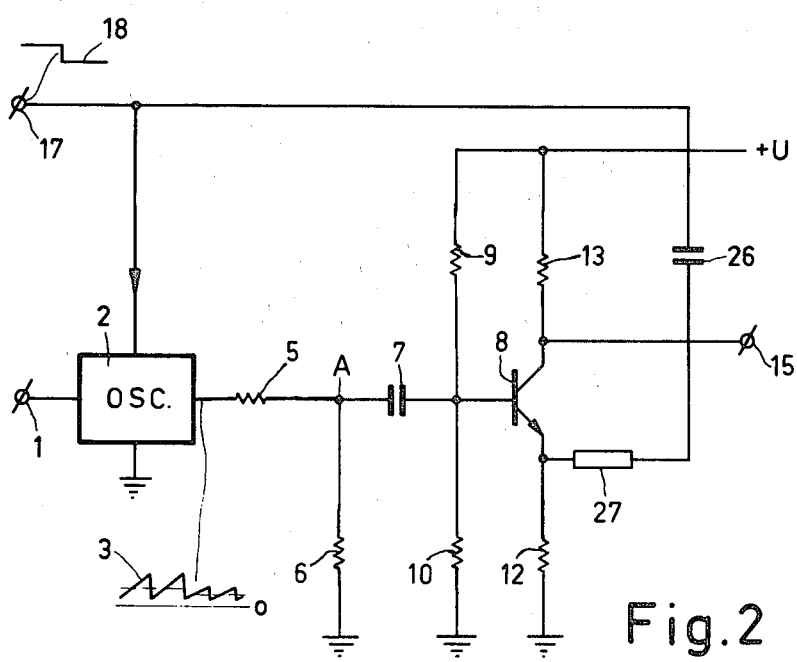

According to a further embodiment of the invention shown in FIG. 2 it is possible instead of compensating before the first high-pass filter to supply the control signal of the terminal 17 to the emitter resistor 12 of the subsequent transistor 8 via a capacitor 26 and resistor 27. In this case the sense of direction of the control signal need not be changed.

When the D.C. component of the sawtooth 3 produces a sudden change at point A this change is fully transferred to the base of transistor 8. However, via the capacitor 26 and the resistor 27 an equally large change (jump) is transferred to the emitter of the transistor 8 so that the base-emitter voltage and consequently the collector current and the signal at the output terminal 15 are substantially not changed. After the sudden change the normal charge change of capacitor 7 and the exponential variation of the base voltage of transistor 8 to the value determined by the voltage divider 9, 10 occur. The time constant of this high-pass filter which is determined by the capacitor 26 and the resistors connected to it must thus be approximately the same as the time constant of the first high-pass filter comprising the capacitor 7, furthermore, the amplitude of the jumps at the base and the emitter, respectively, must be the same which can be adjusted by means of the resistor 27: then the voltage at the base and emitter of the transistor 8 shift in approximately the same manner also after a steep transition so that the output voltage at the terminal 15 remains also unaffected.

To obtain a proper agreement of the time behaviour of the compensation it may be useful to deform, for example by means of RC networks the control signal 18 itself and/or the compensation control signal which is transmitted via the second high-pass filter which comprises the capacitors 22 or 26 respectively.

A circuit arrangement according to the invention is particularly appropriate also when the A.C. signal derived from the terminal 15 is afterwards passed through a low-pass filter, for example an integrating element: such a low-pass filter would by preference transmit just the influences resulting from the change in the D.C. component and would consequently accentuate the disturbances produced.

As in the invention the shift itself can be corrected immediately without taking the A.C. component into account, such a solution is really more perfect than prior attemps at a solution which aimed at making the cut-off frequency of the first high-pass filters as high as possible to transmit the D.C. changes as little as possible. However, a higher cut-off frequency also affects the oscillations in the lower effective frequency range.

What is claimed is:

1. A circuit comprising:
    an output stage;
    a first high pass filter having an input means for receiving an alternating current oscillation having a direct current component with an amplitude in accordance with the amplitude of said oscillation, said direct current component being subject to undesired rapid changes and an output means coupled to said stage for applying said high pass filtered alternating current oscillation together with said undesired direct current component rapid changes to said output stage; and a second high pass filter having an input means for receiving a control signal having rapid changes coinciding with said undesired rapid changes for effecting rapid changes in the amplitude of said alternating current oscillation, whereby the amplitude of said direct current component has rapid changes in accordance with said control signal, and an output means coupled to said stage for applying to said output stage a high pass filtered control signal with a variation for compensating only for said undesired rapid changes of said direct current component of said alternating current oscillations, said first and second filters having a cutoff frequency component of said oscillation and said control signal respectively.

2. A circuit as claimed in claim 1, wherein said direct current component is substantially proportional to the amplitude of said alternating current oscillation.

3. A circuit as claimed in claim 1, wherein said first high pass filter comprises a capacitor.

4. A circuit as claimed in claim 1, wherein said second filter output means is directly coupled to said first filter input means, the cut off frequency of said second filter being lower than the cut off frequency of said first filter, and further comprising means coupled to said second filter input means for reversing the sense of direction changes of said control signal.

5. A circuit as claimed in claim 4, wherein said second filter has a time constant at least four times as large as the time constant of said first filter.

6. A circuit as claimed in claim 4, wherein said second filter has a time constant at least ten times as large as the time constant of said first filter.

7. A circuit as claimed in claim 4, wherein said second filter comprises a capacitor.

8. A circuit as claimed in claim 5, wherein said output stage comprises a transistor amplifier having a base electrode directly coupled to said first filter output means, thereby receiving said rapid changes in a selected direction, a collector electrode coupled to an output terminal, and an emitter electrode coupled to an emitter impedance element; said second filter output means being directly coupled to said element for applying thereto said high pass filtered control signal in the same direction as said rapid changes are applied to said base electrode, said second filter having a time constant at least approximately equal to the time constant of said first filter.

* * * * *